May 19, 1964  E. J. HEITZMAN  3,133,766
LOAD RESPONSIVE BRAKING SYSTEM
Filed March 24, 1961
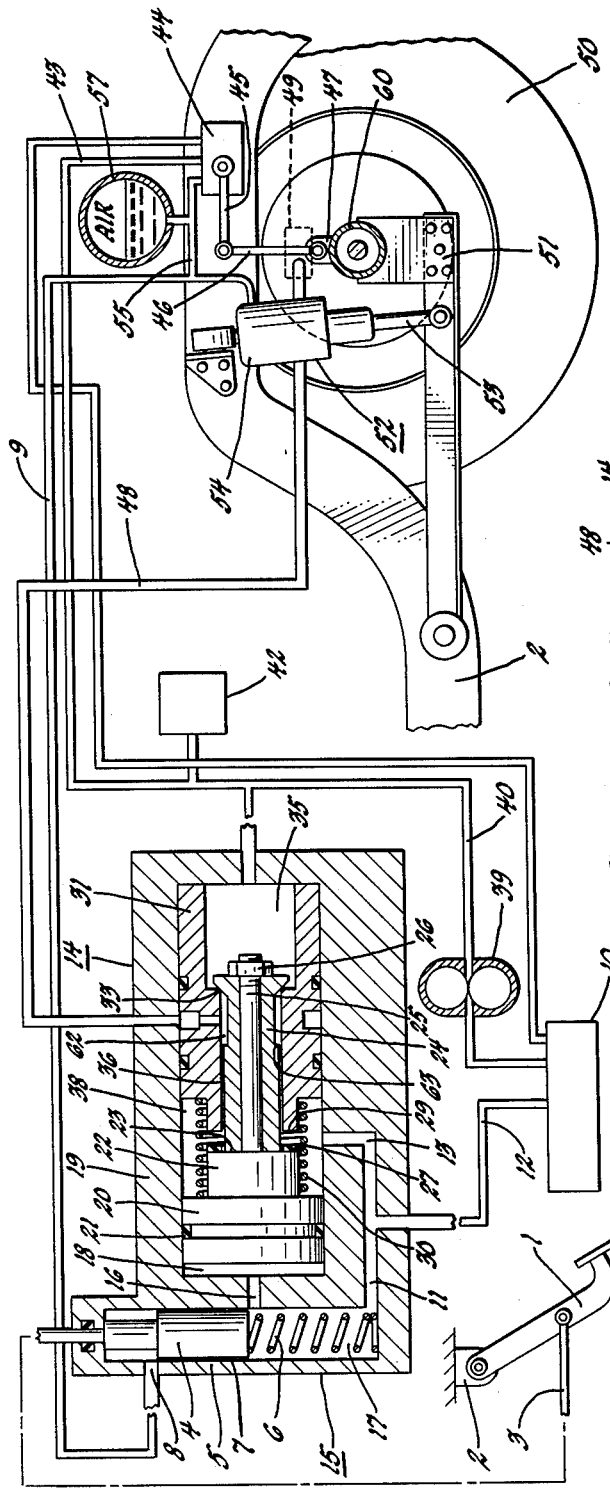
INVENTOR.
Edward J. Heitzman
BY
Arthur L. Nelson
HIS ATTORNEY //United States Patent Office

3,133,766
Patented May 19, 1964

3,133,766
LOAD RESPONSIVE BRAKING SYSTEM
Edward J. Heitzman, Rochester, Mich., assignor to General Motors Corporation, Detroit, Mich., a corporation of Delaware
Filed Mar. 24, 1961, Ser. No. 98,147
8 Claims. (Cl. 303—22)

This invention relates to a vehicle braking system and more particularly to a means for regulating the braking effort on each of the vehicle wheels in response to the load carried on the vehicle wheel.

The conventional vehicle braking system provides fixed braking effort on all of the vehicle wheels regardless of the load carried on the vehicle wheels. It is a known fact that the friction between the vehicle tire and the road bed is directly proportional to the load carried on the vehicle wheel. With this in mind the optimum braking system would apply braking effort on each of the plurality of wheels in direct proportion to a load carried on the particular wheel. Accordingly this invention is intended to provide a braking system wherein the braking effort on each of the wheels is controlled in response to a load carried on each of the plurality of wheels.

It is an object of this invention to provide a braking system having means for regulating the degree of braking effort on each of the plurality of wheels in response to the load carried on each of the vehicle wheels.

It is another object of this invention to construct a braking system in communication with a hydraulic pressure control unit operating in response to the wheel load and thereby providing a braking effort according to the load on the wheel.

It is a further object of this invention to provide braking effort on each of the plurality of vehicle wheels regulated according to a pressure control unit and thereby providing a braking effort substantially in proportion to the friction between the vehicle wheel and the road bed.

The objects of this invention are accomplished through a hydraulic fluid, air cushion fluid suspension system. A leveling valve controls the pressure within the suspension system on each of the four wheels. A pressure control unit is included in combination with a manual brake actuating control means to provide a controlled pressure to operate the vehicle brakes. The controlled pressure is dependent on the degree of actuation of the brake lever and also the control pressure on the pressure regulating means. The control pressure operates a piston and valve metering the fluid in the brake actuating fluid line. In this manner the fluid pressure for actuating the vehicle brakes is metered so that the braking actuation is in direct response to the load carried on each of the plurality of vehicle wheels.

Further objects and advantages of the present invention will be apparent from the following description, reference being had to the accompanying drawings wherein a preferred embodiment of the present invention is clearly shown.

In the drawings:

FIGURE 1 is a schematic view of the suspension system and the braking system with a cross-sectional view of the pressure control and amplifier unit.

FIGURE 2 is a cross-section view of the pressure control unit with the brake actuating valve in the open position to provide brake actuation.

Referring to FIGURE 1 the brake pedal 1 is pivotably mounted on the vehicle chassis 2 and pivotably connected to the push rod 3. The push rod 3 controls the movement of the spool 4 within the cylinder 5. The spool 4 is biased to a retracted position as indicated in FIGURE 1 by the spring 6. The spool 4 has a loose fit tolerance relative to the cylinder 5 providing a clearance passage 7 between the outer periphery of the spool and the inner periphery of the cylinder 5. An orifice 8 is in communication with the vehicle suspension system through conduit 9. The pressure in the vehicle suspension system is controlled through a leveling device to maintain a constant height of the vehicle chassis relative to the vehicle wheel. The leveling system includes means for dampening the effect of roughness on the road, etc. The lower portion of the cylinder 5 is in communication with the reservoir 10 through the drain orifice 11 and conduit 12. The drain passage 13 is also in communication with the conduit 12 and reservoir 10.

A pressure amplifier unit 14 is also formed integral with the pressure regulating unit 15. A control orifice 16 is in communication with the drain chamber 17 in the pressure regulator unit in FIGURE 1. The control orifice 16 is also in communication with the control chamber 18 within the amplifying cylinder 19. An amplifier piston 20 is received within the amplifier cylinder 19. A seal 21 is received on the outer periphery of the piston 20. The piston 20 has a portion of reduced diameter 22 forming a radial planar surface 23. A valve element 24 is bolted in engagement with the radial planar surface 23 by the bolt 25 and nut 26. The radial planar surface 23 receives a discharge valve element 27 which engages the valve seat 29 when the discharge valve is closed. The spring 30 normally biases the sleeve 31 in spaced relation to the valve element 27.

In this position the sleeve 31 forming the valve seat 33 normally contacts the frusto-conical section of the valve element 24. The pressurized fluid chamber 35 is not in communication with the plurality of wheel brakes when the actuating valve element 24 and the valve seat 33 are in their normally closed positions.

The actuating valve element 24 forms a clearance passage 36 with the inner periphery of the sleeve 31 to permit drainage of fluid from the brake actuating system to the discharge chamber 62 to the reservoir 10.

The pressurizing chamber 35 is normally filled with pressurized fluid from the pump 39 through the conduit 40. The pump 39 is in constant operation maintaining a source of pressurized fluid. The fluid pressure is maintained through the accumulator 42.

The conduit 40 is also connected to the conduit 43 leading to the leveling valve 44. The leveling valve 44 is operated by the pivoting arm 45 which is connected to the link 46 and the shaft housing 47. The hydraulic fluid actuating conduit 48 connects the pressure amplifying unit 14 to the hydraulic wheel cylinder 49. The hydraulic wheel cylinder 49 operates a conventional vehicle brake to provide a means for braking the vehicle wheel 50. The vehicle wheel 50 is supported by the arm 51 pivotably connecting the chassis 2. The wheel 50 is permitted to move relative to the chassis against the hydro-pneumatic spring 52. The push rod 53 is connected to the arm 51. The housing 54 is connected to the chassis 2 and the vehicle load compresses the air in the suspension system.

The conduit 9 leads to the pressure regulator 15 from the housing 54 and the conduit 55 leads to the leveling valve 44 and the accumulator 57 from conduit 9. The accumulator 57 contains oil, and air which is compressible, and serves to maintain the pressurization in the air suspension system. The leveling valve 44 maintains a level condition of the motor vehicle by admitting and releasing pressurized fluid from the suspension system in response to relative movement between the shaft housing 60 and the chassis 2. This pressure is transmitted to the pressure regulating cylinder 5 through conduit 9 which in turn controls the pressure for actuating the vehicle brakes.

Referring to FIGURE 2 the spool 4 is shown in the operating position creating an increased pressure in the control chamber 18 which baises the actuating valve 24 to an open position at seat 33. With the actuating valve in the open position the chamber 62 is in communication with the pressurized fluid chamber 35 thereby actuating the vehicle brakes. The fluid pressure in chamber 62 tends to bias the actuating valve 24 to a closed position due to the shoulder 63 on the valve element 24 and the cross-section area of passage 36 at the end thereof adjacent reduced diameter piston 22.

The operation will be described in the following paragraphs. When the vehicle is in operation the pump 39 is pumping hydraulic fluid and maintaining a pressure in combination with the accumulator 42. The fluid pressure is present within the chamber 35 of the pressure amplifier and is also in communication with the leveling valve 44 of the suspension system. The leveling valve 44 operates in response to relative movement between the chassis 2 and the shaft housing 60. This relative movement is transmitted to the arm 45 by the link 46. As the chassis 2 and the shaft housing 60 move closer together pressurized fluid is permitted through the leveling valve 44 into the conduit 55 and accumulator 57. The movement of pressurized fluid causes the fluid chamber defined by the spring 54 to expand. In this manner a constant distance is maintained between the shaft housing 60 and the chassis 2. The greater the load on the chassis 2 and carried by wheel 50 the greater the pressure in the accumulator 57. This also transmits a greater pressure through the conduit 9 to the pressure regulator 15.

As the brake pedal 1 is depressed the spool 4 moves axially within the cylinder 5 to compress the spring 6. The inlet orifice 8 permits fluid to flow from the orifice to the drain orifice 11 by means of the clearance passage 7. Limited flow of fluid is permitted through the clearance passage which provides a pressure gradient between the inlet orifice 8 and the drain orifice 11. The position of the spool 4 is regulated by the brake pedal 1. The movement of the spool 4 against the spring 6 causes a high pressure end of the gradient to move more closely to the control orifice 16. The closer the high pressure end of the spool to the orifice 16 the greater the pressure existing in the control chamber 18. The control chamber 18 biases the piston 20 to close the discharge valve consisting of the valve element 27 and the valve seat 29. This movement of the piston 20 relative to the sleeve 31 also causes an opening of the brake actuating valve consisting of the valve element 24 and the valve seat 33. With an opening of the brake actuating valve, pressurized fluid from chamber 35 is permitted to pass through the compensating chamber 62 and through the brake actuating conduit 48 to the wheel cylinder 49. In this manner the vehicle brakes are actuated in response to the position of the spool 4 in cylinder 5. As the pressure in the chamber 52 decreases, the piston 20 is biased to a position reducing the volume of the control chamber 18. A continued movement of the piston 20 moves the brake actuating valve 24 toward a more restrictive pressure position at seat 33 and a less restrictive position at seat 29 until it maintains an intermediate pressure of the actuating fluid in the wheel cylinder 49. A further depression of the brake pedal 1 moves the spool 4 to further compress the spring 6 causing an increase in pressure in the control chamber 18. This in turn opens the brake actuating valve at seat 33 permitting greater pressure of fluid in the conduit 48 and the wheel cylinder 49.

As the brake pedal 1 is released the spool 4 returns to the position shown in FIGURE 1. In this position the drain pressure exists on the control orifice 16. The spring 30 biases the piston 20 to the position as shown in FIGURE 1, closing the brake actuating valve at seat 33. The fluid pressure in the wheel cylinder 49 and line 48 is released through the clearance passage 36 created by the loose fitting tolerance between the valve element 24 and sleeve 31.

Pump 39 provides a pressure for controlling the suspension system, the pressure regulating unit and the pressure amplifier unit as well as actuating the vehicle brakes. It can be seen that the pressure of fluid at the inlet orifice 8 directly controls the degree of brake actuation for a given pedal movement. The pressure at orifice 8 is dependent upon the load on vehicle wheel 50. With an increase of load on the vehicle wheel 50 the pressure in the suspension system also increases in response to the control of the leveling valve 44. Accordingly the load on wheel 50 directly controls the degree of brake effort on wheel 50 in response to operation of the brake pedal 1.

While the embodiment of the present invention as herein disclosed constitutes a preferred form, it is to be understood that other forms might be adopted.

What is claimed is as follows:

1. A vehicle braking system comprising in combination; a hydro-pneumatic suspension system including a fluid spring means adapted for connection with a sprung and an un-sprung member on a motor vehicle, a variable volume chamber defined by said fluid spring means, valve means controlling the flow of pressurized fluid in said chamber of said spring means in response to the load carried on said sprung member, and pressurizing means in communication with said valve means; a pressure regulating valve means comprising an inlet passage, conduit means connecting said fluid spring with said inlet passage in said pressure regulating valve means, means for discharging fluid from said pressure regulating valve means to a fluid reservoir, a control passage intermediate said inlet passage and said discharge means, means fluid connecting said pressurizing means and said reservoir to conduct fluid from said reservoir to said pressurizing means; a pressure amplifying means including a pressure responsive member communicating with said control passage, and a brake actuating valve in communication with said pressurizing means; a braking means; means connecting said brake valve with said pressure responsive member; conduit means connecting said brake actuating valve with said braking means; said brake actuating valve biased to an open position in response to movement of said pressure responsive means to provide brake actuation in response to the degree of fluid pressure in said hydro-pneumatic spring when said vehicle brakes are actuated.

2. A vehicle braking and suspension system including: a fluid suspension system comprising a vehicle chassis, a suspension member associated with a vehicle wheel, a hydro-pneumatic spring connecting said chassis with said suspension member, a fluid reservoir, fluid pressurizing means connected to receive fluid from said reservoir, a leveling valve, and conduit means connecting said hydro-pneumatic spring with said pressurizing means and said leveling valve; a pressure regulating valve including a cylinder, a piston operating in said cylinder adapted for connection with manual operating means, an inlet orifice connected to said suspension system, a drain orifice in said cylinder communicating with said reservoir, and a control orifice in said regulating cylinder intermediate with said inlet orifice and said drain orifice; a pressure amplifier unit comprising an amplifier cylinder and an amplifier piston operating in said cylinder in response to fluid pressure in said control orifice; a braking system including braking means, brake conduit means connecting said pressurizing means with said braking means, and a brake control valve in said brake conduit means connected to said amplifier piston normally biased to a closed position and opened in response to pressurized fluid on said amplifier piston to provide brake actuation in response to the relative position of said piston in said pressure regulating means and the inlet orifice pressure thereby providing brake actuation in response to the load on said vehicle wheel when said vehicle brakes are actuated.

3. A vehicle braking and suspension system comprising in combination; a vehicle fluid suspension system including a vehicle chassis, a suspension member associated with a vehicle wheel, a hydro-pneumatic spring connecting said suspension member with said chassis, a fluid pump, a leveling valve operating in response to relative movement between said suspension member and said chassis, and conduit means connecting said hydro-pneumatic spring with said pump through said leveling valve; a vehicle braking system comprising a vehicle brake, conduit means connecting said vehicle brake with said pump, a brake actuating valve in said connecting conduit means, a brake control means including a cylinder and a spool in said cylinder normally biased to a retracted position and an inlet orifice and conduit means conveying suspension system pressure to said cylinder and a drain orifice and a control orifice intermediate of said drain orifice and said inlet orifice, said spool operating in said cylinder adapted for manual operation, and a clearance passage formed by said spool and said cylinder to provide a pressure gradient between said drain orifice and said inlet orifice; and a pressure amplifying unit including a pressure responsive member, a control chamber in communication with said control orifice receiving a pressurized fluid to operate said pressure responsive member, and means connecting said pressure responsive member with said brake actuating valve to open said valve in proportion to the pressurization of fluid in said inlet orifice and the relative position of said spool in said cylinder thereby providing brake actuation in response to the load on said vehicle wheel when said vehicle brakes are actuated.

4. A vehicle suspension and braking system comprising in combination: a fluid suspension system including a hydro-pneumatic spring; means for pressurizing fluid, a vehicle brake, a vehicle wheel associated with said vehicle brake, conduit means connecting said vehicle brake with said pressurizing means, a brake actuating valve in said conduit means, a pressure regulating valve including a cylinder and a spool operating in said cylinder in response to manual means, and an inlet orifice and a drain orifice in said cylinder and a pressure control orifice in said cylinder intermediate said drain orifice and said inlet orifice, conduit means connecting said hydro-pneumatic spring with said inlet orifice, and a pressurizing amplifier unit including a housing and a pressure responsive member in said housing and a control chamber defined by said pressure responsive member and said pressure amplifier unit housing and in communication with said control orifice and means connecting said brake actuating valve to said pressure responsive member and biasing said brake actuating valve to an open position to provide brake actuation in response to the pressurization of fluid in said inlet orifice and the relative position of said spool of said regulator relative to said control orifice thereby providing brake effort in proportion to the load carried on said vehicle wheel.

5. A vehicle braking and suspension system comprising; a fluid suspension system including a hydro-pneumatic spring, a vehicle wheel associated with said spring, valve means admitting pressurizing fluid in said hydro-pneumatic spring in response to said load on the wheel; a vehicle braking system comprising fluid pressurization means, a vehicle brake associated with said vehicle wheel, a brake actuating conduit means connecting said pressurizing means with said vehicle brakes, a brake actuation valve in said brake actuating conduit means, a pressure regulating means including a housing having a regulating chamber formed therein and a spool received in said regulating chamber, and clearance passage about the outer periphery of said spool to provide a pressure gradient and an inlet orifice in communication with said regulating chamber and a drain orifice in communication with said pressure regulating chamber and a control orifice intermediate of said inlet orifice and said drain orifice, and a pressure amplifying unit including a housing and a pressure responsive member and a control chamber formed in said pressure amplifier unit housing in communication with said control orifice and having one wall thereof formed by a portion of said pressure responsive member and means connecting said pressure responsive member with said brake actuating valve thereby controlling the opening of said brake actuating valve in response to the pressure in said control chamber thereby providing braking effort in proportion to the load carried on said vehicle wheel.

6. A vehicle braking and suspension for a vehicle having a vehicle chassis, a vehicle load supporting wheel, and a suspension member associated with said vehicle wheel; said system comprising: a fluid suspension system employing a hydro-pneumatic spring, said spring connecting said chassis and said suspension member, a fluid pump, a leveling valve, and conduit means connecting said fluid pump with said spring through said leveling valve to maintain a pressure in said fluid system proportional to the load on said vehicle wheel; a vehicle wheel braking system including braking means, a brake actuating conduit means connecting said fluid pump with said braking means, a brake actuating valve in said brake actuation conduit means, a pressure regulating unit including means defining a regulating chamber and a spool adapted for manual operation operating within said control chamber and an inlet orifice transmitting fluid pressure from said suspension system to said inlet orifice and a drain orifice in said regulating chamber and a control orifice intermediate said inlet orifice and said drain orifice in said regulating chamber, and clearance passage means defined by said spool and said means forming said regulating chamber, an amplifier unit including, means defining an amplifier chamber having said control orifice fluid connected therewith and a pressure responsive member received therein and means connecting said pressure responsive member to said brake actuating valve; said pressure responsive member controlling the operation of said brake actuation valve in response to the pressure in said inlet orifice and the relative position of said regulating spool relative to said control orifice thereby providing braking effort proportional to the load carried on the associated wheel.

7. A vehicle braking and suspension system comprising: a fluid suspension system having a vehicle wheel, a vehicle chassis, a suspension member associated with said vehicle wheel, a hydro-pneumatic fluid spring connected to said chassis and said suspension member, a fluid pump, a leveling valve, and conduit means providing controlled communication from said fluid pump to said fluid spring through said leveling valve; a pressure regulating unit comprising, means defining a pressure regulating chamber, an inlet orifice for said regulating chamber, conduit means placing communication between said inlet orifice and said fluid suspension system, a drain orifice in communication with said regulating chamber, and a control orifice intermediate said drain orifice and said inlet orifice; a pressure amplifying unit comprising, means defining a pressure amplifying chamber, a pressure responsive member in said pressure responsive chamber, and a control chamber in said pressure amplifier unit in communication with said control orifice; a vehicle braking system including a vehicle brake associated with said vehicle wheel, conduit means connecting said pump with said vehicle brake, a brake actuating valve in said conduit and means normally biasing said brake actuating valve to a normally closed position; said pressure responsive member biasing said brake actuating valve to an open position to provide brake actuation of said vehicle wheel in response to the pressure of fluid in said hydro-pneumatic spring.

8. A vehicle suspension and braking system comprising: a fluid suspension system including a vehicle chassis, a vehicle wheel, a suspension member associated with said vehicle wheel, an air cushioned oil spring connecting said vehicle chassis with said suspension member, a fluid pump, a leveling valve, and conduit means controlling communication from said pump to said spring through said leveling valve; a pressure regulating unit comprising, an inlet passage, conduit means connecting said fluid suspension system with said inlet passage, means defining a pressure regulating chamber, a spool operating within said pressure regulating chamber, a clearance passage formed by said spool and said means defining said pressure regulating chamber, a drain passage communicating with said pressure regulating chamber, a control passage intermediate with said drain passage and said inlet passage, and manual means controlling the spool position relative to said control passage thereby regulating the pressure in said control passage; a pressure amplifier comprising, a pressure amplifying cylinder, a pressure amplifying piston in said pressure amplifying cylinder, a control chamber defined by said pressure amplifying piston and cylinder in communication with said control passage, a sleeve received in said cylinder mounted concentric with said pressure amplifying piston, a brake actuating valve element connected to said pressure amplifying piston, a pressurizing chamber formed within said sleeve, a clearance control passage formed by the inner periphery of said sleeve and the outer periphery of said brake actuating valve element, and a discharge valve formed by said sleeve and said pressure amplifying piston, said discharge valve normally biased to an open position and said brake actuating valve normally biased to a closed position, said pressurizing amplifying piston biasing said brake actuating valve to an open position in response to pressurization of fluid in said control chamber responsive to the fluid pressure in said suspension system and the position of said spool relative to the control passage in said pressure regulating valve thereby providing braking effort proportional to the load on the associated vehicle wheel.

References Cited in the file of this patent
UNITED STATES PATENTS
2,991,130    Sampietro _____ July 4, 1961